United States Patent Office 3,840,549
Patented Oct. 8, 1974

3,840,549
PREPARATION OF 2-HYDROCARBYLDITHIO-5-MERCAPTO - 1,3,4-THIADIAZOLES BY THIOHYDROCARBYL EXCHANGE
Eli W. Blaha and Adam S. Kurasiewicz, Wheaton, Ill., assignors to Standard Oil Company, Chicago, Ill.
No Drawing. Filed Aug. 22, 1972, Ser. No. 282,676
Int. Cl. C07d 91/62
U.S. Cl. 260—302 SD    8 Claims

ABSTRACT OF THE DISCLOSURE

Thiohydrocarbyl exchange between 2,5 - bis(hydrocarbyldithio-1,3,4-thiadiazole and 2,5-dimercapto-1,3,4-thiadiazole produces 2-hydrocarbyldithio-5-mercapto-1,3,4-thiadiazole.

BACKGROUND OF INVENTION

2 - Hydrocarbyldithio - 5 - mercapto-1,3,4-thiadiazoles, a class of exceedingly active elemental sulfur scavengers, and the preparation thereof by oxidative coupling of equal molecular portions of a hydrocarbyl mercaptan and 2,5-dimercapto-1,3,4-thiadiazole or its alkali metal mercaptide are disclosed in U.S. Pat. No. 3,663,561.

The preparation of 2,5-dimercapto-1,3,4-thiadiazole has been long known from the publication by M. Busch and E. Ziegile in J. Pract. Chem. (2) vol. 60, pages 25 to 42.

2,5-Bis(hydrocarbyldithio)-1,3,4-thiadiazoles and their preparation are disclosed in U.S. Pats. Nos. 2,719,126 and 3,087,932. The preparation according to the first patent involves the reaction between a hydrocarbyl mercaptan and the 2,5-disulfenyl chloride of 1,3,4-thiadiazole. The preparation of the second patent involves oxidative coupling of hydrocarbyl mercaptan and 2,5-dimercapto-1,3,4-thiadiazole or its alkali metal mercaptides used in the respective molar ratio of reactants of 2.0:1.0.

A novel technique for the preparation of 2-hydrocarbyldithio-5-mercapto-1,3,4-thiadiazoles has been discovered which does not make use of either hydrocarbyl mercaptan or oxidative coupling or reaction solvent. Rather the preparative technique makes use of thiohydrocarbyl exchange from 2,5-bis(hydrocarbyldithio)-1,3,4-thiadiazole and 2,5-dimercapto-1,3,4-thiadiazole.

SUMMARY OF INVENTION

Any member of the class of 2-hydrocarbyldithio-5-mercapto-1,3,4-thiadiazoles can be prepared by simply reacting 2,5-dimercapto-1,3,4-thiadiazole with any member of the class of 2,5-bis(hydrocarbyldithio)-1,3,4-thiadiazole in the presence or absence of solvent. The hydrocarbyl groups in the product and the reactant can be alkyl, cycloalkyl, alkaryl and aralkyl groups having 1 to 280 carbon atoms. Upon combining the reactants one thiohydrocarbyl group is exchanged from bis(hydrocarbyldithio)-1,3,4-thiadiazole to 2,5-dimercapto-1,3,4-thiadiazole apparently by the neucleophilic attack of a mercapto group of 2,5-dimercapto-1,3,4-thiadiazole on one of the disulfide linkages of bis(hydrocarbyldithio)-1,3,4-thiadiazole to cleave the disulfide linkage and add a proton.

By the use of equal molecular portions of 2,5-dimercapto-1,3,4-thiadiazole and 2,5 - bis(hydrocarbyldithio)-1,3,4-thiadiazole there is obtained substantially only the 2-hydrocarbyldithio-5-mercapto-1,3,4-thiadiazole. By adjusting the molar ratio of 2,5 - bis(hydrocarbyldithio)-1,3,4-thiadiazole to 2,5-dimercapto-1,3,4-thiadiazole there can be readily obtained any desired mixture of 2-hydrocarbyldithio-5-mercapto-1,3,4-thiadiazole and 2,5 - bis(hydrocarbyldithio)-1,3,4-thiadiazole.

The thiohydrocarbyl exchange from 2,5 - bis(hydrocarbyldithio)-1,3,4-thiadiazole to 2,5-dimercapto - 1,3,4-thiadiazole takes place when combining those two reactants at ambient room temperature. While the thiohydrocarbyl exchange is slow at room temperature, such exchange can be accelerated by heating the mixture of reactants. For example, the reaction between equal molar portions of 2,5-bis(hydrocarbyldithio)- and 2,5-dimercapto-1,3,4-thiadiazoles is completed in five minutes or less by heating the mixtures of the two 1,3,4-thiadiazoles to a temperature just above the melting point of the desired 2-hydrocarbyldithio-5-mercapto-1,3,4-thiadiazole but preferably below the decomposition temperature of 2,5-dimercapto-1,3,4-thiadiazole which melts with decomposition at 166° C.

The patents before mentioned with respect to 2-hydrocarbyldithio-5-mercapto-1,3,4-thiadiazole and 2,5-bis(hydrocarbyldithio) - 1,3,4 - thiadiazole are useful reference bases for the specific alkyl, cycloalkyl, aryl, aralkyl and alkaryl hydrocarbon groups constituting the $C_1$–$C_{280}$ hydrocarbyl group of said 1,3,4-thiadiazoles. Specifically without limitation thereon, the alkyl hydrocarbon portion of such hydrocarbyl group in such 1,3,4-thiadiazoles can be methyl, ethyl, n-propyl, isopropyl, n-butyl, isobutyl, sec. butyl, tert. butyl, n-pentyl, mixed amyl that are predominantly primary $C_5$ alkyl, hexyl, cyclohexyl, methylcyclohexyl, heptyl, octyl, 2-ethylhexyl, nonyl, decyl, dodecyl, hexadecyl, eicosyl, hentricontyl, hexacertyl, polypropyl and polybutyl having 3–70 propyl or butyl groups, phenyl, tolyl, ethylphenyl, nonylphenyl, dodecylphenyl, benzyl, phenethyl, and the like.

The following examples illustrate the thiohydrocarbyl exchange forming the basis of this invention.

Example 1

A mixture of 4.4 grams (0.01 mole) of pure 2,5-bis(tert. octyldithio)-1,3,4-thiadiazole (M.P. 32° C.) and 1.5 grams (0.01 mole) of pure 2,5-dimercapto-1,3,4-thiadiazole are heated to 115° C. and stirred. After five minutes a uniform liquid product forms which solidifies upon cooling to 100° C. The solid is then taken up in hot benzene and recrystallized from the benzene solution. The recrystallized solid is found to have a melting point of 111–113° C. identical with the melting point of 2-tert. octyldithio-5-mercapto-1,3,4-thiadiazole. Mixing of equal amounts of the recrystallized product and pure 2-tert. octyldithio-5-mercapto-1,3,4-thiadiazole did not cause depression of its 111–113° C. melting point. The thin layer chromatographs of the recrystallized product and of pure 2-tert-octyldithio-5-mercapto-1,3,4-thiadiazole were found to be identical. Therefore, the recrystallized product was 2-tert.-octyldithio-5-mercapto-1,3,4-thiadiazole. The yield of recrystallized product was substantially quantitative (0.02 mole).

Example 2

Following the procedure of Example 1 there is prepared 2-ethyldithio-5-mercapto-1,3,4-thiadiazole by heating to 100° C. equal molar portions of 2,5-bis(ethyldithio)-1,3,4-thiadiazole and 2,5-dimercapto-1,3,4-thiadiazole. By this method a substantially quantitative yield of 2-ethyldithio-5-mercapto-1,3,4-thiadiazoles can be obtained.

Example 3

There is prepared 2-($C_{60}$ alkyldithio)-5-mercapto-1,3,4-thiadiazole by heating a mixture of equal molar portions of 2,5-dimercapto - 1,3,4 - thiadiazole and 2,5-bis($C_{60}$ alkyldithio)-1,3,4-thiadiazole. The $C_{60}$ alkyl is from 860 moleular weight polyisobutylene converted to its 839 MW mercaptan for preparation of the bis compound. Heating the resulting mixture to a temperature of 100° C. gave a uniform product which was a substantially quantitative yield of 2-($C_{60}$ alkyl-dithio)-5-mercapto-1,3,4-thiadiazole.

Example 4

There is prepared 2-dodecyldithio - 5 - mercapto-1,3,4-thiadiazole, which is a viscous liquid, by mixing and heating at 100° C. equal molar portions of 2,5-dimercapto-1,3,4-thiadiazole and 2,5 - bis(dodecyldithio)-1,3,4-thiadiazole. The product is exhausted with room temperature benzene and the benzene removed from the solution by distillation. The liquid, viscous residue is 2-dodecyldithio-5-mercapto-1,3,4-thiadiazole.

Example 5

A mixture of 0.1 mole (15 grams) 2,5-dimercapto-1,3,4-thiadiazole and 1.0 mole (438 grams) of 2,5-bis(tert. octyldithio)-1,3,4-thiadiazole is stirred and heated to 115° C. for five minutes. The resulting mixture of liquid and solid is taken up in Decalin (decahydronaphthalene). Such solution contains 0.2 mole of 2-(tert. octyldithio)-5-mercapto-1,3,4-thiadiazole and 0.9 mole of 2,5-bis(tert. octyldithio)-1,3,4-thiadiazole and can be added to lubricant oils to provide them with the known beneficial functions of the mono- and bis-tert. octyldithio - 1,3,4 - thiadiazole solutes.

Example 6

There are combined 0.25 mole 2,5-dimercapto-1,3,4-thiadiazole and 1.0 mole of the 2,5-bis($C_{60}$ hydrocarbyldithio)-1,3,4-thiadiazole described in Example 3. The mixture is heated to 110° C. for about 10 minutes and then dissolved in light mineral oil (SAE–5W oil) to obtain a 50 weight percent solution of the thiadiazoles which comprise 0.5 mole 2-($C_{60}$ hydrocarbyldithio) - 5 - mercapto-1,3,4-thiadiazole and 0.75 mole 2,5-bis($C_{60}$ hydrocarbyldithio)-5-mercapto-1,3,4-thiadiazole which can be diluted with other lubricant base oils (e.g. SAE–10, SAE–20, etc. or mixture thereof) in the formulation of lubricant base oils or reacted with elemental sulfur at 210° C. and then diluted with additional SAE–5W oil to a total solute content of 1.0–5.0 weight for use as an extreme pressure lubricating cutting oil.

Example 7

There are combined, stirred and heated to 100° C. 0.5 mole of 2,5-dimercapto-1,3,4-thiadiazole and 1.0 mole 2,5-bis(dodecyldithio)-1,3,4-thiadiazole. The resulting product is dissolved in an amount of SAE–5W weight lubricating oil to provide a 50 weight percent total concentration of solute which comprises 1.0 mole 2-(dodecyldithio)-5-mercapto-1,3,4-thiadiazole and 0.5 mole 2,5-bis(dodecyldithio)-1,3,4-thiadiazole as a concentrate for use with concentrates of detergent, zinc dialkyl dithiophosphate antioxidant, high based calcium alkylbenzene sulfonate antiwear and viscosity index improver agents for blending with lubricating oil base stocks (e.g., SAE–10 weight oil) to formulate a multigrade lubricating oil which has sulfur scavenging properties in addition to the properties imparted by the other addition agents.

What is claimed is:

1. A method of preparing 2-(hydrocarbyldithio)-5-mercapto-1,3,4-thiadiazole which comprises mixing 2,5-dimercapto-1,3,4-thiadiazole and 2,5 - bis(hydrocarbyldithio)-1,3,4-thiadiazole wherein said hydrocarbyl group of the reactant and product are alkyl and have 1 to 280 carbon atoms.

2. The method of claim 1 wherein the mixture is at a temperature in the range from ambient temperature to just below the decomposition temperature of 2,5-mercapto-1,3,4-thiadiazole.

3. The method of claim 2 wherein equal molar portions of 2,5-dimercapto - 1,3,4 - thiadiazole and 2,5-bis(hydrocarbyldithio)-1,3,4-thiadiazole are mixed and the sole product is 2-(hydrocarbyldithio)-5-mercapto-1,3,4-thiadiazole.

4. The method of claim 3 wherein the 2,5-bis(hydrocarbyldithio)-1,3,4-thiadiazole is 2,5-bis(tert. octyldithio)-1,3,4-thiadiazole, the mixture is heated to 115° C. and the sole product is 2-(tert. octyldithio) - 5 - mercapto-1,3,4-thiadiazole.

5. The method of claim 3 wherein the 2,5-bis(hydrocarbyldithio)-1,3,4-thiadiazole is 2,5-bis($C_{60}$ polybutyldithio)-1,3,4-thiadiazole, the mixture is heated to 100–110° C., and the sole product is 2-($C_{60}$ polybutyldithio)-5-mercapto-1,3,4-thiadiazole.

6. The method of claim 3 wherein the 2,5-bis(hydrocarbyldithio)-1,3,4-thiadiazole is 2,5-bis(dodecyldithio)-1,3,4-thiadiazole and the sole product is 2-dodecyldithio-5-mercapto-1,3,4-thiadiazole.

7. The method of claim 1 wherein for each mole of 2,5-dimercapto-1,3,4-thiadiazole there is used the 2,5-bis(hydrocarbyldithio)-1,3,4-thiadiazole in an amount in excess of one mole and the resulting product comprises a mixture of the 2-(hydrocarbyldithio)-5-mercapto-1,3,4-thiadiazole and the 2,5-bis(hydrocarbyldithio) - 1,3,4 - thiadiazole in which mixture the molar content of 2-(hydrocarbyldithio)-5-mercapto-1,3,4-thiadiazole is two times the moles of 2,5-dimercapto-1,3,4-thiadiazole used and the molar content of 2,5-bis(hydrocarbyldithio)-1,3,4-thiadiazole is equal to the molar excess of its use.

8. The method of claim 7 wherein the molar ratio of 2,5-dimercapto-1,3,4-thiadiazole to 2,5-bis(hydrocarbyldithio)-1,3,4-thiadiazole is 1.0:2.0–10.0 and in the resulting mixture the molar ratio of 2-(hydrocarbyldithio)-5-mercapto-1,3,4 - thiadiazole to 2,5-bis(hydrocarbyldithio)-1,3,4-thiadiazole is 2.0:1.0–9.0.

References Cited
UNITED STATES PATENTS
3,663,561   5/1972   Blaha _____ 260—302 SD RICHARD J. GALLAGHER, Primary Examiner U.S. Cl. X.R.
44—63; 252—47, 189